March 8, 1927.
V. BENDIX
BRAKE MECHANISM
Filed June 13, 1925
1,619,806
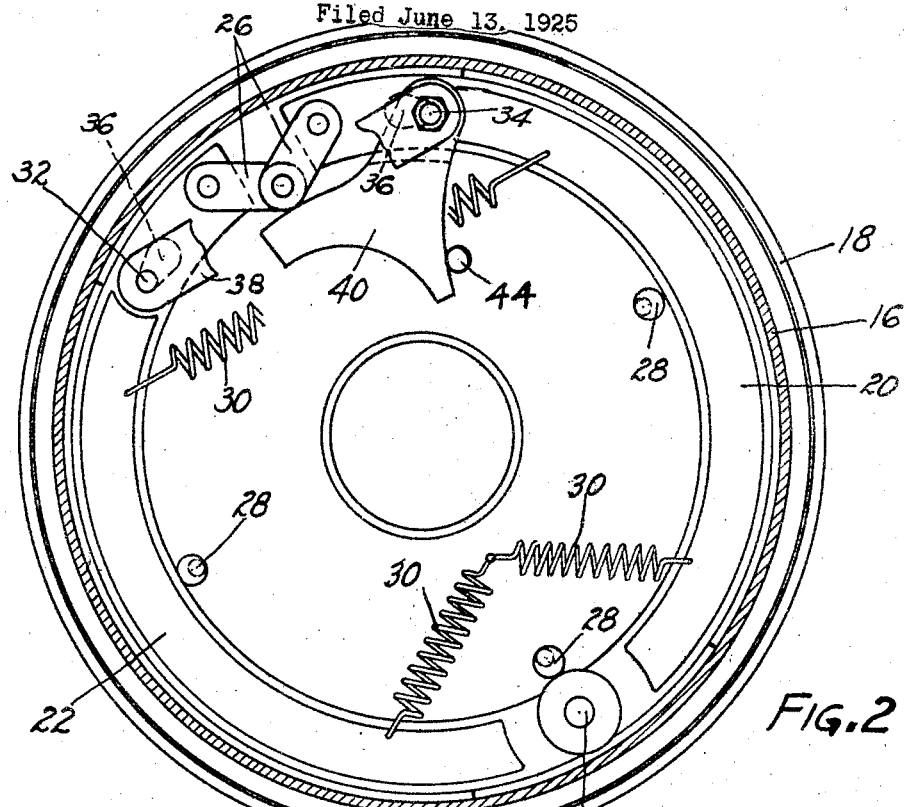
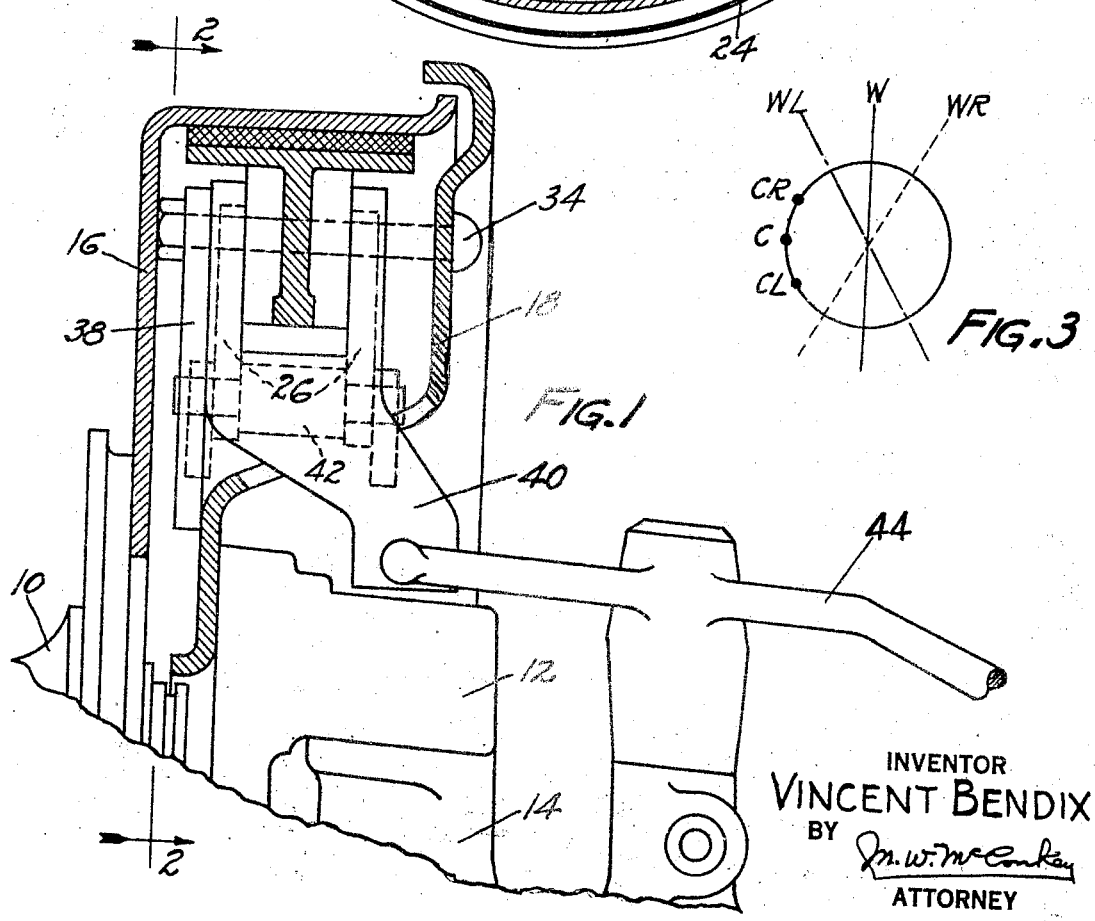
INVENTOR
VINCENT BENDIX
BY
M. W. McConkey
ATTORNEY Patented Mar. 8, 1927.

1,619,806

UNITED STATES PATENT OFFICE.

VINCENT BENDIX, OF CHICAGO, ILLINOIS, ASSIGNOR TO BENDIX BRAKE COMPANY, OF CHICAGO, ILLINOIS, A CORPORATION OF ILLINOIS.

BRAKE MECHANISM.

Application filed June 13, 1925. Serial No. 36,816.

This invention relates to brakes and is illustrated as embodied in a brake for a swivelled automobile wheel. An important object of the invention relates to providing a novel control mechanism permitting the use on a swivelled wheel of the so-called "double wrapping" or "duo servo" type of brake. The controls heretofore used on brakes for swivelled wheels are of a type which would be affected by the circumferential shifting in one direction or another of a duo servo brake and are therefore not suitable for use with a brake of this character. The present invention contemplates the use of a control having a joint which is substantially in the swivelling axis of the wheel when the brake is applied and whose position is not affected by the circumferential shifting in one direction or the other of the duo servo brake.

In one desirable arrangement this joint or point of engagement between the swivelling and non-swivelling parts of the control is movable generally at right angles to the swivelling axis to a position substantially in that axis, this arrangement permitting the use of a much simpler control.

Another feature of the invention consists in an arrangement of parts permitting the use of a duo servo type of brake while at the same time varying the action of the brake when the wheel is swivelled, preferably by relieving the pressure on the brake when on the outside of a turn. In the illustrated arrangement this is done by arranging the joint between the swivelling and non-swivelling parts of the control when the brake is applied slightly at one side of the swivelling axis.

Other features of the invention relate to expanding the duo servo friction device by a lever or equivalent member which has a surface arranged, when the brake is applied, substantially co-axially with respect to the drum, to facilitate the circumferential shifting of the expanding means; together with an arrangement permitting the pivoting of the brake-applying lever upon the brake anchor; and other novel combinations of parts and desirable particular constructions which will be apparent from the following description of one illustrative embodiment of the invention shown in the accompanying drawings, in which:

Figure 1 is a vertical section through the upper part of one front wheel brake and associated parts;

Figure 2 is a vertical section through the brake just inside the wheel on the line 2—2 of Figure 1, showing the friction means in side elevation; and Figure 3 is a diagram illustrating the relieving of the pressure on the brake when the wheel is on the outside of a turn.

In the arrangement shown in the drawings the invention is embodied in an automobile chassis including a road wheel, the hub of which is indicated at 10, rotatably mounted on a knuckle 12 swivelled by the usual king pin or the like at one end of the axle 14. The wheel carries the usual brake drum 16 and the knuckle 12 carries the usual backing plate or other stationary support 18. Except as further described below, these parts or their equivalents may be of any desired construction.

The particular brake illustrated includes a friction device of the duo servo type including substantially rigid arcuate shoes 20 and 22 pivotally connected at 24 and arranged to be expanded in applying the brake by toggle links 26. The idle position of the shoes is determined by means shown as three eccentric adjustable stops 28 against which the shoes are urged by springs 30.

The torque is taken from the connected shoes 20 and 22 at either end according to the direction of rotation of the drum by one or the other of two anchors shown as bolts 32 and 34 passing through slots 36 in the webs of the shoes. I prefer to connect the anchors 32 and 34, which are carried by the backing plate 18 or by a suitable bracket, by means of a plate 38 bridging their free ends and reinforcing them.

A brake-applying lever 40 has a forked end straddling the ends of shoe 20 and pivotally mounted on the end of anchor 34. This lever has an arcuate surface engaging the toggle links 26 or a roller 42 carried by the toggle links and which surface, when the brake is applied, is substantially co-axial with respect to the drum 16 to permit the described slight circumferential shifting of the shoes 20 and 22 and toggle 26.

The lever 40 or its equivalent, which constitutes the swivelling part of the control, is engaged by a non-swivelling part such as a pivoted lever 44 shown as mounted on the axle 14. It will be seen that the movement of the lever 44 in a generally horizontal plane will swing the lever 40 in a direction to expand the shoes 20 and 22 against the drum and that the joint between levers 40 and 44 is not affected in any way by the slight circumferential shifting of the brake shoes. The joint or point of engagement between the swivelling and non-swivelling parts of the control is substantially in the swivelling axis when the brake is applied, and in the particular arrangement illustrated this joint or point of engagement moves substantially at right angles to the swivelling axis to its active position in that axis. The particular joint shown consists of a ball end on the lever 44 in engagement with a substantially vertical plane surface on the end of lever 40.

When it is desired to release the outside brake on a turn, or otherwise vary the braking when the wheel is swivelled, this joint or point of engagement is arranged slightly at one side of the swivelling axis. In Figure 3 is illustrated the arrangement when an outer brake is to be released. This figure shows on an enlarged scale, several times the actual dimensions, the arrangement in diagrammatic plan view. The swivelling axis is at the center of the circle shown in the diagram, and the line W is a line through the swivelling axis parallel to the wheel when the wheel is directed straight ahead. The dotted line WR indicates the position parallel to the wheel when it is swivelled to the right, and the dash-and-dot line WL is parallel to the wheel when swivelled to the left. The point C indicates the position of the joint between levers 40 and 44 when the brake is applied and the wheel is parallel to the line W. If now the wheel is swivelled to a position parallel to the line WR, placing the brake on the outside of the turn, the end of lever 40 moves to a position CR,—it moves away from the end of the lever 44 and relieves the pressure on the brake. On the other hand, if the wheel is swivelled parallel to the line WL, placing the brake on the inside of the turn, the end of the lever 40 tends to move to a position CL,—that is, it crowds against the end of the lever 44 and increases the pressure on the brake. It will be understood that in using this arrangement the two front brakes are not equalized against each other.

The above-described control may, if desired, be operated by a cable or other tension member directly connected to lever 40, the lever 40 being in that case pivoted on anchor 32, and, if the outer wheel is to be released, the joint being on the opposite side of the swivelling axis from the wheel.

While one illustrative embodiment of the invention has been described in detail, it is not my intention to limit its scope to that particular embodiment or otherwise than by the terms of the appended claims.

I claim:

1. A vehicle having, in combination, a swivelled wheel having a brake drum, a friction device circumferentially shiftable to anchor at either end and engageable with the drum, and means for applying the friction device including an operating device acting directly on the friction device and swivelling with the wheel, together with an operating device which does not swivel with the wheel, said operating devices engaging each other in a joint moved substantially at right angles to the swivelling axis in applying the brake, and said means permitting the shifting of the friction device without substantially affecting the brake.

2. A vehicle having, in combination, a swivelled wheel having a brake drum, an expansible friction device within the drum having adjacent free ends, means for taking torque from the friction device at either end according to the direction of rotation of the drum, and means for forcing the free ends apart to apply the brake including an operating device acting directly on the friction device and swivelling with the wheel, together with an operating device which does not swivel with the wheel, said operating devices engaging each other in a joint moved substantially at right angles to the swivelling axis in applying the brake, and said means permitting the shifting of the friction device without substantially affecting the brake.

3. Brake mechanism comprising, in combination, a swivelled wheel and a drum, a plurality of shoes within the drum so arranged that in either direction of rotation of the drum one of the shoes is movable circumferentially with the drum and applies the adjacent shoe, and brake-applying means including a part swivelling with the wheel and a non-swivelling part having a joint permitting the swivelling of the wheel when the brake is applied, the position of the joint being unaffected by the direction of rotation of the drum.

4. Brake mechanism comprising, in combination, a swivelled wheel having a drum, a friction device engageable with the drum and having a slight circumferential movement in either direction to anchor at either end according to the direction of rotation of the drum, and brake-applying means comprising a part swivelling with the wheel and a non-swivelling part having a joint movable in applying the brake generally at right angles to the swivelling axis.

5. Brake mechanism comprising, in combination, a swivelled wheel having a drum, a friction device anchoring at either end according to the direction of rotation of the drum, and means for forcing said device against the drum including a lever swivelling with the wheel and a part engaging said lever, the point of engagement being movable in applying the brake generally at right angles to the swivelling axis.

6. Brake mechanism comprising, in combination, a swivelled wheel, retarding means for the wheel, a device for applying the retarding means, a movable member swivelling with the wheel and having rolling engagement with said device, and a non-swivelling operating part connected to said member for applying the brake, the joint being movable in applying the brake generally at right angles to the swivelling axis to an active position permitting the swivelling of the wheel.

7. Brake mechanism comprising, in combination, a swivelled wheel having a drum, an expansible friction device within the drum anchoring at either end according to the direction of rotation of the drum, an expanding device acting on the friction device, a movable part swivelling with the wheel and having rolling engagement with the expanding device to permit circumferential shifting of the friction device, and an operating member for applying the brake engaging the member swivelling with the wheel at a point adjacent the swivelling axis when the brake is applied.

8. Brake mechanism comprising, in combination, a swivelled wheel having a drum, a friction device engagable with the drum and arranged to anchor at either end according to the direction of rotation of the drum, means swivelling with the wheel for forcing the friction device against the drum, and a pivoted lever for operating said means, the point of engagement between the lever and said means being movable generally at right angles to the swivelling axis to an active position permitting the swivelling of the wheel, being substantially unaffected by the direction of rotation of the drum.

9. Brake mechanism comprising, in combination, a swivelled wheel having a drum, a friction device engagable with the drum, and arranged to anchor at either end according to the direction of rotation of the drum, a part swivelling with the wheel and arranged to force the friction device against the drum, and a non-swivelling part for operating the part swivelling with the wheel, the point of engagement between said parts being so arranged with respect to the swivelling axis when the brake is applied as to vary the pressure on the brake when the wheel is swivelled.

10. Brake mechanism comprising, in combination, a swivelled wheel having a drum, an expansible friction device within the brake arranged to anchor at either end according to the direction of rotation of the drum, a brake applying means for expanding the friction device constructed and arranged to relieve the pressure on the brake when the wheel is on the outside of a turn, the relief in pressure being substantially the same whichever end of the friction device is anchored.

11. Brake mechanism comprising, in combination, a swivelled wheel having a drum, an expansible friction device within the drum arranged to anchor at either end according to the direction of rotation of the drum, a part swivelling with the wheel and arranged to expand the friction device against the drum, and a non-swivelling part for operating the part swivelling with the wheel to apply the brake, the point of engagement between said parts when the brake is applied being slightly at one side of the swivelling axis so that swivelling the wheel varies the pressure on the brake.

12. Brake mechanism comprising, in combination, a swivelled wheel having a drum, an expansible friction device within the drum arranged to anchor at either end according to the direction of rotation of the drum, a part swivelling with the wheel and arranged to expand the friction device against the drum, and a non-swivelling member arranged to push said part forwardly in applying the brake, the point of engagement between said member and said part when the brake is applied being between the swivelling axis and the wheel.

13. A brake comprising, in combination, a drum, an expansible friction device within the drum arranged to anchor at either end according to the direction of rotation of the drum, an expanding device engaging the ends of the friction device, and an operating member engaging the expanding device to apply the brake and having an arcuate surface which engages the expanding device and which is arranged when the brake is applied to be substantially co-axial with respect to the drum.

14. A brake comprising, in combination, a drum, an expansible friction device within the drum arranged to anchor at either end according to the direction of movement of the drum, a toggle including links connected to the ends of the friction device and extending inwardly of the drum, and a brake-applying lever having a surface arranged when the brake is applied to be co-axial with respect to the drum and which engages and expands the toggle.

15. A brake comprising, in combination, a drum, a friction device within the drum, an anchor for one end of the friction device, and a lever arranged to expand the friction device against the drum and which is pivotally fulcrumed on said anchor, and which has a brake-applying portion spaced from said anchor.

16. A brake comprising, in combination, a drum, an expansible friction device within the drum, an operating lever arranged to expand the friction device against the drum, a lever having a forked end straddling one end of the friction device, and a member pivotally supporting the arms of the lever and passing through an opening in the friction device and serving as a torque-taking anchor for the friction device.

In testimony whereof I have hereunto signed my name.

VINCENT BENDIX.